D. HOATS.
Clover Huller.
No. 4,653
Patented July 20, 1846.
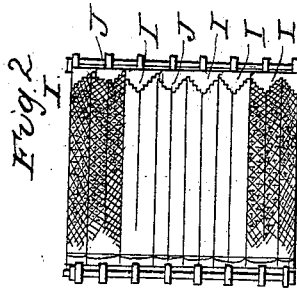
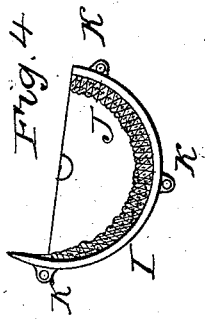
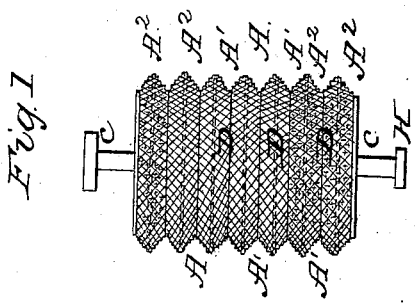
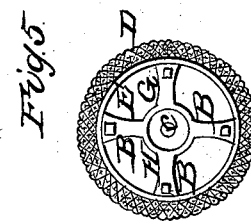
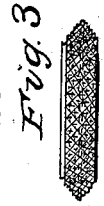
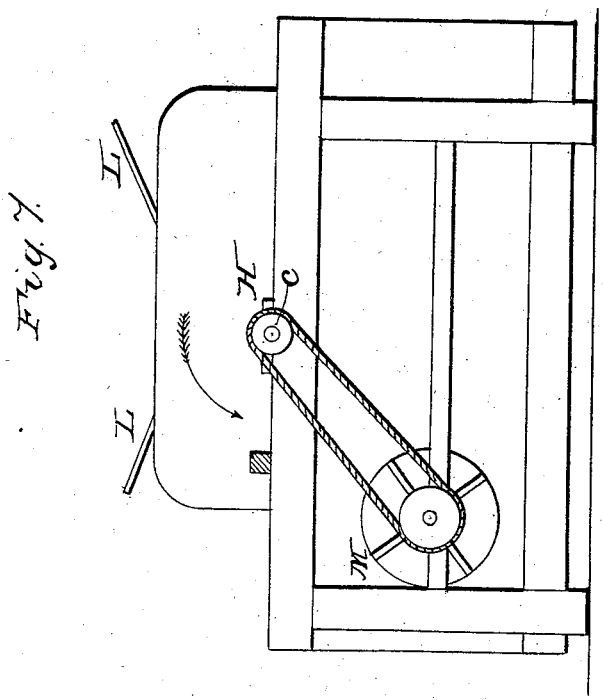

UNITED STATES PATENT OFFICE.

DANIEL HOATS, OF MIFFLINBURG, PENNSYLVANIA.

THRESHING-MACHINE.

Specification of Letters Patent No. 4,653, dated July 20, 1846.

*To all whom it may concern:*

Be it known that I, DANIEL HOATS, of Mifflinburg, in the county of Union and State of Pennsylvania, have invented a new and useful Improvement in the Construction of Machines for Separating Clover-Seed from the Hulls, which is described as follows, reference being had to the annexed drawings of the same, making part of this specification.

Figure 1 is a top view of the revolving rubber for separating the seed from the hulls in a concave. Fig. 2 is a top view or plan of the concave in which the rubber revolves. Fig. 3 is a plan of one of the disks composing the revolving cylindrical rubber. Fig. 4 is a side elevation of one of the semicircular segments composing the concave stationary bed in which the rubber revolves. Also one of the heads attached to the end of the concave. Fig. 5 view of one of the end disks with radial arms and hub. Fig. 6 view of one of the disks between the end disks showing the ears thereon.

The frame, hopper, fan, case gearing and stationary parts of the machine are made and arranged in the usual manner.

The improvement in the machine, intended to be claimed, is in the manner of constructing the revolving rubber and stationary concave in which it revolves for rubbing out the seed from the heads or hulls.

The revolving rubber A is composed of a series of disks held together by a number of screw rods B and nuts, having a horizontal shaft C passing through the center of the same turning in suitable boxes on the sides of the frame, said revolving rubber (when finished) resembling a cylinder having a series of circular channels A' or triangular grooves around its circumference, and a series of circular rings A², each of a triangular or wedge shape in the cross section, covered with pyramidal or diamond shaped teeth D on the two beveled sides of each disk, made to correspond with similarly shaped teeth on the beveled or sloped sides of the semicircular plates composing the concave. The edges E of the disks are rabbeted together so as to form close joints. On the inner periphery of each disk are cast ears F except the two end disks which are provided with hubs and radial arms G perforated with round holes corresponding with the holes in the ears to admit the screw rods that hold the disks together. The shaft passes through the center of the hubs of the two end disks. A pulley H is fixed on the shaft for a band by which it is turned.

In constructing the concave the segments I composing it would resemble a disk divided on its diameter having the beveled edges containing the pyramidal teeth J next the inner periphery instead of next the outer periphery; and the perforated ears K for the screw rods on the outer periphery instead of the inner periphery as in the disks. These segment plates have their edges put together by rabbets. They are held together between two semicircular heads through which the screw rods pass that pass through the ears for holding the parts together.

When the revolving rubber is properly arranged in the concave for operation the toothed edges of the disks will revolve in the channels of the concave, the teeth of the disks being as far from the teeth of the concave as to allow the seed to pass between them without being bruised. When in operation the rubber will turn in the direction of the arrow. The heads of clover will be introduced to the rubber by the hopper L and will be carried around into the concave in the direction of the arrow and when in the concave the seed will be rubbed from the hulls by the pyramidal teeth and the seed and chaff will then be discharged upon the vibrating screen, through which the seed will descend to a receiver or box placed below it, while the chaff or hulls will pass off at the rear end of the screen and the lighter particles of chaff and dust or dirt will be blown from the seed by the revolving fan M.

Having thus fully described my improvements I wish it to be understood that I do not claim as my invention the forming the cylinder in triangular ribs or in separate rings merely; but

What I do claim as my invention and desire to secure by Letters Patent is—

The combination of the pyramidal teeth with the triangular ribs as above described.

DANIEL HOATS.

Witnesses:
A. P. BROWNE,
WM. H. STEVENS.